Patented June 18, 1929.

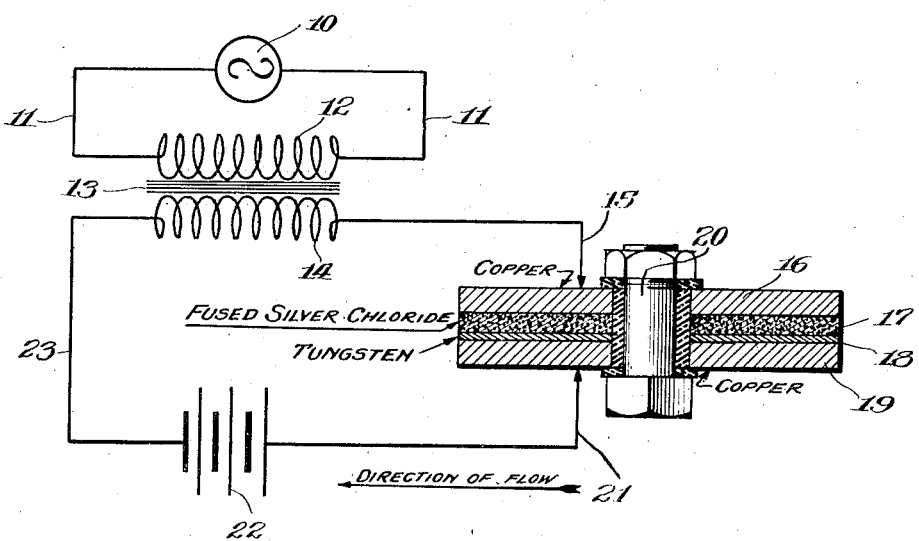

1,717,517

UNITED STATES PATENT OFFICE.

HARRY N. MILLER, OF CHICAGO, AND EDGAR W. ENGLE, OF LAKE FOREST, ILLINOIS, ASSIGNORS TO FANSTEEL PRODUCTS COMPANY, INC., OF NORTH CHICAGO, ILLINOIS, A CORPORATION OF NEW YORK.

ALTERNATING-CURRENT RECTIFIER.

Application filed January 3, 1928. Serial No. 244,087.

This invention relates to an alternating current rectifier of the type in which a solid conductor is in contact with a metal plate to give unilateral conduction. Heretofore devices of this type have been limited to copper discs coated with an oxide or sulphide to which is applied a soft metal conductor such as lead or aluminum. They have been limited to low voltages, and it has been necessary to connect a number of these units in series to obtain a voltage sufficient for charging an ordinary storage battery.

The object of this invention is to provide an improved rectifier of this type using a new combination of contacting members.

Other objects will be apparent as the detailed description of our invention proceeds.

In general, our invention comprises a partially reduced chloride composition in contact with a metal such as tantalum, tungsten, molybdenum, etc. The chloride, preferably silver chloride, is fused on a copper plate which forms one terminal of the rectifier and the tungsten is preferably mounted on a copper backing which serves as the other terminal. When the surfaces of the fused silver chloride and the tungsten are pressed together, current will flow from the compound to the tungsten but will not flow in the opposite direction.

A single unit of this type, using discs about one inch in diameter, will rectify alternating current at 7 1/2 volts to charge a battery at 6 volts with a charging rate of 2 amperes.

The invention will be better understood from a preferred embodiment which is illustrated in the accompanying drawings.

An alternating current source 10 is connected by suitable conductors 11, which are preferably from the ordinary electric lighting power mains, to the primary 12 of a transformer. This transformer is provided with a suitable iron core 13 and a secondary 14 wound thereon, the relative windings of the transformer being arranged to give a suitable voltage across the rectifier, which, in the present example, is about 7 1/2 volts.

A conductor 15 connects one end of the secondary to a copper plate 16 on which is fused a composition of silver chloride 17. The silver chloride is preferably prepared by treating silver nitrate with sodium chloride and carefully washing and drying the precipitate. The copper plate or disc is thoroughly cleaned and all impurities are removed from its surface by mechanical or chemical means, and it is then covered with a layer of the silver chloride prepared as above stated. The covered plate is heated over a gas flame, by electrical resistance, in a furnace, or by any other suitable means, until the salt becomes fused and partially reduced by the metallic copper.

Dry silver chloride is not a conductor of electricity. We have found, however, that when silver chloride is fused on a copper plate, as described above, its properties are markedly changed and the cold, solidified mass is a conductor which offers a negligible resistance to current flow. Since the compound is fused directly on the copper plate, there will be an excellent electrical contact between these members.

The irregularities on the fused mass are removed by an abrasive, by filing, or by other suitable means, and a disc 18 of tungsten is placed in contact with it. The tungsten disc 18 is preferably welded to a copper or nickeled steel support 19 in order to effect a saving in the cost of manufacture, tungsten being a relatively expensive metal.

Suitable means, such as an insulated bolt 20, is provided for supplying the necessary pressure, as it is found that the stability and the rectification ratio of the rectifier are markedly improved by increased pressure.

The copper plate 19 is connected by a conductor 21 to the positive pole of storage battery 22, the negative plate of which is attached by conductor 23 to the other terminal of the secondary 14.

The rectification appears to take place at the point of contact between the fused silver chloride and the tungsten disc.

It has heretofore been necessary to provide rectifiers of this general type with fins for radiating heat. Our improved rectifier, however, is characterized by extremely low resistance and the disc, substantially one inch in diameter, will supply 2 amperes without appreciable heat loss.

In another embodiment, we mix equal parts of lead and sulphur in a crucible and heat till all sulphur fumes are driven off, cool the resulting powder and mix it with an equivalent amount of cuprous chloride. This mixture is spread on an iron plate, smoothed off and fused in situ by the ordinary gas burner or other heating means. The compound melts at about a red heat, adheres firmly to the iron and forms a semimetallic coating which is subsequently smoothed off so that a better contact may be made with the disc of tungsten, tantalum, or other metal used as a cathode, the plates or discs being pressed together as in the preferred embodiment. The general voltage range of this rectifier is about the same as of the former.

Tungsten has been described as the preferred cathode in this rectifier but other metals, such as tantalum, molybdenum, columbium, etc., may also be used. Our invention is not limited to silver chlorides as other chlorides have been found to operate in this manner. The change in this chloride, when it is fused on the supporting plate, is thought to be a partial reduction, but we do not limit ourselves to any theory or explanation of the phenomena.

While we have described a preferred embodiment of our invention, it is understood that we are not limited to the details given except as defined by the appended claims.

We claim:

1. An alternating current rectifier comprising a metal of the group comprising tungsten, tantalum, molybdenum and columbium and a solid compound in contact with said metal, said compound including a partially reduced chloride.

2. An alternating current rectifier comprising tungsten and a solid compound in contact with said tungsten, said compound including a partially reduced chloride.

3. An alternating current rectifier comprising a metal of the group comprising tungsten, tantalum, molybdenum and columbium and a solid compound in contact with said metal, said compound including a chloride that has been rendered conductive by fusion on a copper plate.

4. An alternating current rectifier comprising tungsten and a solid compound in contact with said tungsten, said compound including a chloride that has been rendered conductive by fusion on a copper palte.

5. An alternating current rectifier comprising a metal of the group comprising tungsten, tantalum, molybdenum and columbium and a solid compound in contact with said metal, said compound including a chloride of a metal of the copper group, said chloride having been rendered conductive by fusion on a copper plate.

6. An alternating current rectifier comprising tungsten and a solid compound in contact with said tungsten, said compound including a chloride of a metal of the copper group, said chloride having been rendered conductive by fusion on a copper plate.

7. An alternating current rectifier comprising tungsten and a solid compound in contact with said tungsten, said compound including a chloride of a metal of the copper group, said chloride having been rendered conductive by partial reduction.

8. An alternating current rectifier comprising a metal of the tantalum-tungsten groups and a solid compound in contact with said metal, said compound including a chloride of a metal of the copper group, said chloride having been rendered conductive by partial reduction.

9. An alternating current rectifier comprising tungsten and a solid conductive compound containing silver chloride.

10. An alternating current rectifier comprising a metal of the tantalum-tungsten groups and a solid conductive compound containing a silver chloride.

11. An alternating current rectifier comprising tungsten and a solid compound containing silver chloride which has been rendered conductive by fusion on a copper plate.

12. An alternating current rectifier comprising a metal of the tantalum-tungsten groups and a solid compound containing silver chloride which has been rendered conductive by fusion on a copper plate.

13. A conductor for electric currents comprising a fused and partially reduced metallic chloride.

14. A conductor for electric currents comprising fused and partially reduced silver chloride.

15. A conductor comprising a copper plate and silver chloride fused on said plate, whereby the silver chloride is rendered conductive.

16. A rectifier comprising a copper plate, silver chloride fused on said plate, and a tungsten plate in contact with said fused mass.

17. A rectifier comprising metallic tungsten, a conductive silver chloride in contact with said tungsten, and means for exerting pressure to hold said conductive silver chloride in firm contact with said tungsten.

18. An alternating current rectifier comprising a copper disc, a solid silver chloride compound fused on said disc, a tungsten disc in contact with the fused silver chloride compound, a support for the tungsten disc, and insulated means for pressing the discs together.

In witness whereof, we hereunto subscribe our names this 14th day of December, 1927.

HARRY N. MILLER.
EDGAR W. ENGLE.